(12) United States Patent
Finerman et al.

(10) Patent No.: US 7,392,929 B1
(45) Date of Patent: Jul. 1, 2008

(54) WELDABLE SYNTHETIC MATERIAL

(75) Inventors: Terry Finerman, Rochester Hills, MI (US); Abraham Kassa, Shelby Township, MI (US)

(73) Assignee: Zephyros, Inc., Romeo, MI (US)

( * ) Notice: Subject to any disclaimer, the term of this patent is extended or adjusted under 35 U.S.C. 154(b) by 68 days.

(21) Appl. No.: 11/188,679

(22) Filed: Jul. 25, 2005

Related U.S. Application Data

(60) Provisional application No. 60/591,223, filed on Jul. 26, 2004.

(51) Int. Cl.
*B23K 31/02* (2006.01)
*B23K 11/00* (2006.01)

(52) U.S. Cl. .............. 228/122.1; 219/78.01; 219/86.1; 219/91.21

(58) Field of Classification Search .............. 219/86.25, 219/85.16; 228/122.1
See application file for complete search history.

(56) References Cited

U.S. PATENT DOCUMENTS

| | | |
|---|---|---|
| 4,995,545 A | 2/1991 | Wycech |
| 5,047,451 A | 9/1991 | Barrett et al. |
| 5,240,645 A | 8/1993 | Strecker |
| 5,964,979 A | 10/1999 | George et al. |
| 5,985,435 A | 11/1999 | Czaplicki et al. |
| 6,033,300 A | 3/2000 | Schneider |
| 6,096,403 A | 8/2000 | Wycech |
| 6,099,948 A | 8/2000 | Paver, Jr. |
| 6,174,932 B1 | 1/2001 | Pachl |
| 6,189,953 B1 | 2/2001 | Wycech |
| 6,237,304 B1 | 5/2001 | Wycech |
| 6,277,898 B1 | 8/2001 | Pachl |
| 6,284,360 B1 | 9/2001 | Johnson et al. |
| 6,287,666 B1 | 9/2001 | Wycech |
| 6,287,669 B1 | 9/2001 | George et al. |
| 6,330,893 B1 | 12/2001 | O'Connell |
| 6,372,827 B2 | 4/2002 | Johnson et al. |
| 6,406,782 B2 | 6/2002 | Johnson et al. |
| 6,461,691 B1 | 10/2002 | Taylor |
| 6,467,834 B1 | 10/2002 | Barz |
| 6,475,577 B1 | 11/2002 | Hopton et al. |
| 6,486,256 B1 | 11/2002 | Tarbutton et al. |
| 6,502,821 B2 | 1/2003 | Schneider |
| 6,506,494 B2 | 1/2003 | Brandys |
| 6,546,693 B2 | 4/2003 | Wycech |
| 6,561,571 B1 | 5/2003 | Brennecke |
| RE38,157 E | 6/2003 | Schneider |

(Continued)

FOREIGN PATENT DOCUMENTS

EP  0 891 918 B1  2/2001

(Continued)

OTHER PUBLICATIONS

Copending U.S. Appl. No. 10/718,509, filed Nov. 20, 2003. (1001.026RE).

(Continued)

*Primary Examiner*—Kiley Stoner
(74) *Attorney, Agent, or Firm*—Dobrusin & Thennisch PC

(57) ABSTRACT

A synthetic material is applied to a structure of an article of manufacture such as an automotive vehicle. Typically, the material assists in or at last does not interfere with manufacturing steps applied to the article of manufacture.

18 Claims, 2 Drawing Sheets

U.S. PATENT DOCUMENTS

| | | | |
|---|---|---|---|
| 6,582,824 B1 | 6/2003 | Weigl et al. | |
| 6,588,830 B1 | 7/2003 | Schmidt | |
| 6,602,156 B2 | 8/2003 | Schlueter, Jr. et al. | |
| 6,619,727 B1 | 9/2003 | Barz | |
| 6,620,365 B1 * | 9/2003 | Odoi et al. | 264/261 |
| 6,620,501 B1 * | 9/2003 | Kassa et al. | 428/355 R |
| 6,692,347 B1 | 2/2004 | Schneider | |
| 6,733,040 B1 | 5/2004 | Simboli | |
| 6,742,258 B2 | 6/2004 | Tarbutton | |
| 6,750,274 B2 | 6/2004 | Gray et al. | |
| 6,787,607 B2 * | 9/2004 | Sahnoune et al. | 525/191 |
| 6,793,274 B2 | 9/2004 | Riley et al. | |
| 6,811,864 B2 | 11/2004 | Czaplicki et al. | |
| 6,858,260 B2 | 2/2005 | Taylor | |
| 6,921,130 B2 | 7/2005 | Barz | |
| 6,938,947 B2 | 9/2005 | Barz | |
| 6,991,237 B2 | 1/2006 | Kassa | |
| 7,175,204 B2 | 2/2007 | Tarbutton | |
| 2001/0051260 A1 | 12/2001 | Johnson et al. | |
| 2003/0045620 A1 * | 3/2003 | Carlson et al. | 524/394 |
| 2003/0050375 A1 * | 3/2003 | Carlson et al. | 524/394 |
| 2003/0140671 A1 | 7/2003 | Lande et al. | |
| 2003/0144416 A1 | 7/2003 | Tarbutton et al. | |
| 2003/0194548 A1 | 10/2003 | McLeod et al. | |
| 2004/0033344 A1 | 2/2004 | Czaplicki et al. | |
| 2004/0041429 A1 | 3/2004 | McLaren | |
| 2004/0045250 A1 | 3/2004 | Takeuchi | |
| 2004/0048060 A1 * | 3/2004 | Kassa et al. | 428/353 |
| 2004/0076831 A1 * | 4/2004 | Hable et al. | 428/413 |
| 2004/0112531 A1 | 6/2004 | Bogert et al. | |
| 2004/0176515 A1 | 9/2004 | Gray et al. | |
| 2004/0180206 A1 | 9/2004 | Czaplicki et al. | |
| 2004/0185767 A1 | 9/2004 | Schneider | |
| 2004/0260012 A1 | 12/2004 | Krabbenborg et al. | |
| 2004/0266898 A1 * | 12/2004 | Kassa et al. | 521/134 |
| 2005/0027042 A1 | 2/2005 | Pawlik et al. | |
| 2005/0043488 A1 * | 2/2005 | Sahnoune et al. | 525/199 |
| 2005/0087899 A1 * | 4/2005 | Coon et al. | 264/46.4 |
| 2005/0217785 A1 | 10/2005 | Hable et al. | |
| 2005/0221046 A1 * | 10/2005 | Finerman | 428/57 |
| 2005/0230027 A1 * | 10/2005 | Kassa et al. | 156/79 |
| 2005/0260399 A1 * | 11/2005 | Finerman | 428/304.4 |
| 2005/0266237 A1 | 12/2005 | Asthana et al. | |
| 2005/0269840 A1 * | 12/2005 | Finerman et al. | 296/210 |
| 2006/0020076 A1 * | 1/2006 | Finerman et al. | 524/494 |
| 2006/0090343 A1 * | 5/2006 | Riley et al. | 29/897.2 |

FOREIGN PATENT DOCUMENTS

| | | |
|---|---|---|
| EP | 0 893 331 B1 | 3/2001 |
| EP | 1 122 156 B1 | 8/2001 |
| EP | 1 378 421 A1 | 1/2004 |
| EP | 1 240 166 B1 | 2/2004 |
| EP | 1 252 217 | 8/2004 |
| EP | 1 001 893 B1 | 11/2004 |
| WO | WO99/08899 | 2/1999 |
| WO | WO99/08901 | 2/1999 |
| WO | WO00/43253 A1 | 6/2001 |
| WO | WO01/56845 | 8/2001 |
| WO | WO 03/089221 A1 | 10/2003 |

OTHER PUBLICATIONS

Copending U.S. Appl. No. 10/761,635, filed Jan. 21, 2004. (1001.071c1).

Copending U.S. Appl. No. 10/839,084, filed May 5, 2004. (1001.028c1).

Copending U.S. Appl. No. 10/806,309, filed Mar. 22, 2004. (1001.112c1).

Copending Patent Application Serial No. GB 0220945.0 filed Sep. 10, 2002. (1001.099GB).

Copending Patent Application Serial No. EP 0300159.1 filed Jan. 6, 2003. (1001.098EP).

Copending U.S. Appl. No. 10/920,520, filed Aug. 18, 2004. (1001.038).

Copending U.S. Appl. No. 10/941,553, filed Sep. 15, 2004. (1001.143).

Copending U.S. Appl. No. 10/973,050, filed Oct. 25, 2004. (1001.150).

Copending U.S. Appl. No. 10/967,783, filed Nov. 20, 2004. (1001.149).

Copending U.S. Appl. No. 10/873,935, filed Jun. 22, 2004. (1001.142).

Copending U.S. Appl. No. 11/115,668, filed Apr. 27, 2005. (1001.163).

Copending U.S. Appl. No. 60/675,581, filed Apr. 28, 2005. (1001.207p1).

Copending U.S. Appl. No. 60/676,406, filed Apr. 29, 2005. (1001.210p1).

Copending U.S. Appl. No. 60/680,268, filed May 12, 2005. (1001.206p1).

Copending U.S. Appl. No. 60/674,919, filed Apr. 26, 2005. (1001.208p1).

Copending U.S. Appl. No. 60/592,691, filed Jul. 30, 2004. (1001.172p1).

Copending U.S. Appl. No. 60/623,099, filed Oct. 28, 2004. (1001.172p2).

Copending U.S. Appl. No. 10/927,349, filed Aug. 26, 2004. (1001.180).

Prior Sale Reference, Jan. 3, 2003. 1 page.

* cited by examiner

WELDABLE SYNTHETIC MATERIAL

CLAIM OF PRIORITY

This application claims the benefit of the filing date of U.S. Provisional Application No. 60/591,223 filed Jul. 26, 2004.

FIELD OF THE INVENTION

The present invention relates to a synthetic material that is typically suitable for use in conjunction with weld operations.

BACKGROUND OF THE INVENTION

It is generally known to apply a synthetic material to a structure of an article of manufacture for imparting strength, adhesion, acoustic damping, baffling, sealing, reinforcement or the like to the structure. Such synthetic materials are frequently used in articles such as buildings, containers, furniture, transportation vehicles (e.g., automotive vehicles) or the like. Typically, it is desirable that these synthetic materials either assist in, or at least do not interfere with the processing, formation, assembly or the like of the article of manufacture. As an example, it is typically desirable that these synthetic materials, when placed adjacent weld locations, do not inhibit welding of automotive vehicle components. As such, there is a need for a synthetic material that is compatible with operations, which may be performed upon an article of manufacture.

SUMMARY OF THE INVENTION

A synthetic material, which assist or at least does not substantially inhibit weld operations is provided. The synthetic material typically includes a base material that includes a weight percentage of conductive filler. The synthetic material can also include a layer (e.g., film) disposed upon at least one surface of the base material and the layer will also typically include a weight percentage of conductive filler. Generally, the weight percentages of conductive filler in the synthetic material are typically relatively high. Exemplary suitable conductive fillers materials can include, without limitation, graphite, iron phosphite, iron phosphide, nickel or other others.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE INVENTION

The present invention is predicated upon the provision of a synthetic material and a method of using the synthetic material. Typically, the synthetic material includes at least a base material and the base material typically includes a conductive filler, although not required. The synthetic material may include a layer or a film disposed upon one or more surfaces of the base material. Typically, the base material, the layer or both are configured to assist or at least minimally interfere with a fastening (e.g., welding such as spot and/or resistance welding) or other manufacturing operation. The synthetic material can be used to provide various functional attributes to a structure of an article of manufacture such as structural reinforcement, adhesion, baffling, sealing, acoustical damping properties, noise/vibration/harshness (NVH) reduction or a combination thereof between members (e.g. panels), within a cavity or upon a surface of one or more structures (e.g., body panels, pillar structures or frame members) of an article of manufacture (e.g., a transportation or automotive vehicle).

Figure 1:
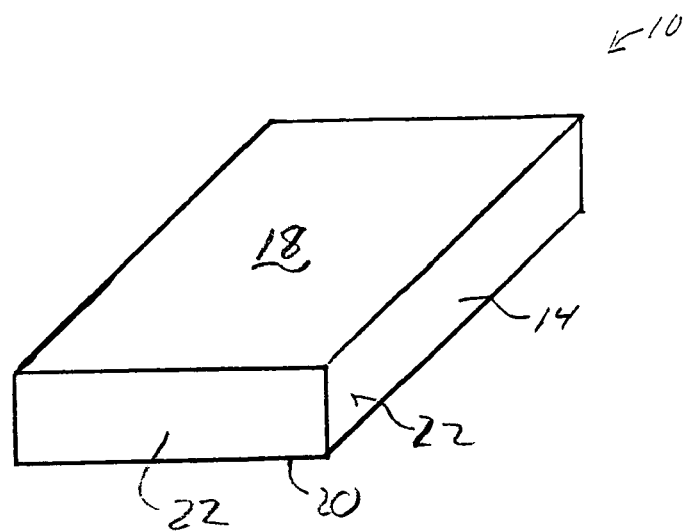
FIG. 1 is a perspective view of an exemplary synthetic material according to an aspect of the present invention.
Figure 2:
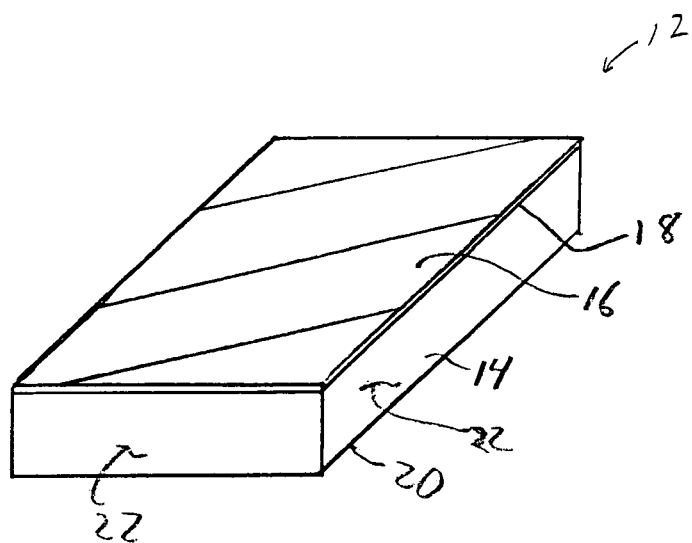
FIG. 2 is a perspective view of another exemplary synthetic material according to an aspect of the present invention.

Referring to FIGS. 1 and 2, there are respectively illustrated a first exemplary synthetic material 10 and a second exemplary synthetic material 12 both formed in accordance with aspects of the present invention. In FIG. 1, the synthetic material 10 includes only a mass 14 of base material. In FIG. 2, the synthetic material 10 includes the mass 14 of base material with a layer or film 16 disposed upon a first surface 18 of the mass 14.

The mass of base material of the present invention typically includes a first surface opposite a second surface and a width therebetween. Generally, the base material may be provided in a variety of shapes and configurations. Some preferred shapes include a disk, a block, a wedge, a tape, combinations thereof or the like. In FIGS. 1 and 2, the mass 14 is generally in the shape of a block or strip and the first surface 18 is generally rectangular and is substantially opposite and parallel to a second rectangular surface 20. As shown, the first surface 18 is separated from the second surface 20 by a substantially uniform thickness (t), however, it is contemplated that the thickness (t) may be variable if desired. Also, as shown, a plurality of side surfaces 22 extend about the periphery of the mass 14.

The layer disposed upon the base material, like the mass of base material, may be in a variety of shapes and configurations. Thus, as used herein, the term "layer" is intended to mean any mass that has a surface suitable for contacting a surface of the base material.

The layer in FIG. 2, as suggested, is illustrated as a film 16. As used herein, the term "film" is intended to mean a sheet having a first surface and a second surface separated by a relatively small thickness (e.g., less than about 5 mm, more typically less than 2.0 mm and even more preferably less than about 0.5 mm). While the thickness is typically relatively thin, it is contemplated that the thickness may be variable or substantially uniform. For exemplary purposes, the present invention discusses films below, however, it should be understood that the discussions of these films can apply equally to most any layer.

In the particular embodiment of FIG. 2, the film 16 is generally rectangular and overlays the substantial entirety of the first surface 18 of the mass 14 of base material. However, it is contemplated that the film may overlay only a portion of the surface or may overlay other additional surfaces such as side surfaces or a bottom surface. The film 16 of FIG. 2 is also shown to be substantially continuous as it spans across the first surface 18 of the mass 14 of base material. It should be understood, however, that the film 16 may be non-continuous (e.g., intermittent, two or more separable films or the like) as it spans across the surface of the base material. Typically, the film is generally dry to the touch and substantially non-tacky, although not required unless otherwise stated.

Base Material

The base material may be formed of a variety of suitable materials. In one embodiment, the base material is formed of a heat activated material having foamable characteristics. In alternative embodiments, the material may be non-foamable or non-expanding. The material may be generally dry to the touch (e.g., non-tacky) or slightly tacky, or more substantially tacky. For particular applications, the material is tacky at temperatures between about −10° C. and about 100° C., more typically tacky at temperatures between about 0° C. and about 70° C. and still more typically tacky at temperatures between about 10° C. and about 50° C. Moreover, the material may be shaped in any form of desired pattern, placement, or thickness, but is preferably of substantially uniform thickness.

The base material may have a polymeric formulation that includes or is based upon one or more of an epoxy, an acrylate, an acetate, an elastomer, a combination thereof or the like. For example, and without limitation, the base material may include ethylene methacrylate (EMA), glycidyldimethacrylate (GMA), glycidyldimethacrylate containing copolymer, a bisphenol epoxy resin, ethylene vinyl acetate (EVA), ethylene or other copolymers and/or terpolymers with at least one monomer type of an alpha-olefin. Other possible materials includes phenol/formaldehyde materials, phenoxy materials, and polyurethane materials or the like. The base material may also include an ethylene propylene diene monomer (EPDM). Preferably, the EPDM has less than 80% and more preferably less than 72% ethylene concentration, although not required. When used, the EPDM will typically comprise between 5% and about 40% of the base material.

The base material can include at least 30% or less, more typically at least 45% and even more typically at least 55%, but typically less than 90% or more, more typically less than 70% and even more typically less than 65% by weight EVA, EMA or both or other ethylene copolymers. One preferred EVA is provided as a copolymer resin having substantial quantities of microcrystalline waxes and is sold under the tradename ELVAX 310, commercially available from DuPont. The base material can include at least 2% or less, more typically at least 5% and even more typically at least 10%, but typically less than 40% or more, more typically less than 20% and even more typically less than 14% by weight EMA. One exemplary EMA is modified with n-butyl acrylate and glycidyl methacrylate and is sold under the tradename ELVALOY 310, commercially available from DuPont.

It shall be recognized that, depending upon the application, a number of baffling, sealing, structural reinforcing, adhesion or other materials, which may be expandable or non-expandable, may be formulated in accordance with the present invention. A typical material includes one or more polymeric base materials, such as one or more ethylene-based polymers which, when compounded with appropriate ingredients (typically a blowing and curing agent), activates (e.g., expands, cures or both) in a reliable and predictable manner upon the application of heat or the occurrence of a particular ambient condition. From a chemical standpoint for a thermally-activated material, which may be structural, sealing or acoustical, can be initially processed as a flowable material before curing, and upon curing, the material will typically cross-link making the material incapable of further flow.

The base material of the present invention has been found particularly useful for application requiring sealing, structural reinforcement, adhesion or the like. For these applications, expansion of the base material is often small if there is any expansion at all, but may be higher in certain situations. In general, it is desirable for the material to include good adhesion durability. Moreover, it is typically desirable that, the material does not generally interfere with the assembly or manufacturing operations employed by automobile or other manufacturers.

It is also contemplated that the base material may include one or more conductive materials, which can assist in weld-through of the material. Examples of such materials includes graphite, carbon-black, iron phosphide, iron phosphite, metal particulate (e.g., pellets, shavings or the like), pure metal particulate (i.e., particulate composed of at least 95% metal), combinations thereof or the like. Typically, the base material includes at least 4% or less, more typically at least 8%, even more typically at least 12% and even more typically at least 14% by weight conductive material. Also typical, the base material includes less than about 30% or more, more typically less than about 20% and even more typically less than about 16% by weight conductive material. In one preferred embodiment, the conductive material is substantially entirely a graphite (e.g., a synthetic, a crystalline flake, a crystalline vein or other graphite) having a range of 40 to 400 mesh, although it could be higher or lower. One exemplary preferred conductive material is a synthetic graphite having range of 70 to 270 mesh sold under the tradename Asbury 4234 and commercially available from Asbury Carbons, Asbury, N.J.

In applications where the base material is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the material is processed along with the automobile components at elevated temperatures or at higher applied energy levels, e.g., during paint curing steps. While temperatures encountered in an automobile assembly operation may be in the range of about 148.89° C. to 204.44° C. (about 300° F. to 400° F.), body and paint shop applications are commonly about 93.33° C. (about 200° F.), 300° F. or higher.

The base material will typically include a curing agent, a curing agent accelerator or both. Amines, amides, peroxides, peroxide coagents, sulfur materials (e.g., pure sulfur or sulfur containing materials) or other chemicals are examples of typical curing agents or curing agent accelerators suitable for curing epoxies, acrylates, acetates, ethylene copolymers combinations thereof or the like. Examples of useful classes of curing agents for such polymeric compounds include, without limitation, aliphatic or aromatic amines or their respective adducts, amidoamines, polyamides, cycloaliphatic amines, (e.g., anhydrides, polycarboxylic polyesters, isocyanates, phenol-based resins (such as phenol or cresol novolak resins, copolymers such as those of phenol terpene, polyvinyl phenol, or bisphenol-A formaldehyde copolymers, bishydroxyphenyl alkanes or the like), peroxides or mixtures thereof. Other exemplary curing agents include modified and unmodified polyamines or polyamides such as triethylenetetramine, diethylenetriamine tetraethylenepentamine, cyanoguanidine, dicyandiamides and the like. Exemplary accelerators for the curing agents might include a modified or unmodified urea such as methylene diphenyl bis urea, an imidazole, a combination thereof or the like.

The blowing agent, when included, may include one or more nitrogen containing groups such as amides, amines and the like. Examples of suitable blowing agents include azodicarbonamide, dinitrosopentamethylenetetramine, 4,4$_l$-oxybis-(benzenesulphonylhydrazide), trihydrazinotriazine and N,N$_l$-dimethyl-N,N$_l$-dinitrosoterephthalamide.

An accelerator for the blowing agents, if desired, may also be provided in the expandable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles, ureas or the like.

The base material may also include other additives as well. Exemplary additives can include oils, waxes, fillers, foaming agents, processing aids, agents or performance modifiers, UV resistant agents, flame retardants, impact modifiers, heat stabilizers, colorants, lubricants, combinations thereof or the like. One preferred but optional additive is a paraffinic oil sold under the tradename SUNPAR 115 commercially available from Sunoco Oil. Another preferred but optional additive is a synthetic and/or paraffinic wax sold under the tradename PARAFLINT A28 commercially available from Moore and Munger, Inc or under the tradename SASOLWAX commercially available from Sasol Wax Americas, inc. Another possible additive includes hydrocarbon resins such as those described below in relation to the film or layer.

If the base material is expandable, it may be configured to have a wide variety of volumetric expansion levels. As an example, the base material may expand to at least about 101%, at least about 300%, at least about 500%, at least about 800%, at least about 1100%, at least about 1500%, at least about 2000%, at least about 2500% or at least about 3000% its original or unexpanded volume. An example of such an expandable material with such variable expansion capabilities is disclosed in commonly owned copending U.S. Patent Application publication 2004/0266898 titled Expandable Material, and fully incorporated herein by reference for all purposes. Of course, in other embodiments, the expandable material may be configured to have less volumetric expansion, particularly for structural applications and other applications as well. For example, the expandable material may be configured to expand between about 110% and about 700% (i.e., about 10% to about 600% greater that the original unexpanded volume), more typically between about 130% and about 400% its original or unexpanded volume.

Upon application to a member and thereafter, it may be desirable for the base material to exhibit desired characteristics to allow for further processing or assembly of the base material, the member to which it is applied or both. For example, it may be desirable for the base material to be elastic such that it can be deformed or stretched followed by allowing the material to at least partially regain its original configuration.

In one embodiment, it is preferable for the base material to be easily displaceable such that it causes minimal interference with further processing or assembly steps. In such an embodiment, the base material will typically have a viscosity, at 45° C. and a shear rate of 400 1/s, of at least about 100 poise or less, more typically at least about 200 poise and even more typically at least about 400 poise. The base material also typically has a viscosity, at 45° C. and a shear rate of 400 1/s, of less than about 1200 poise or greater, more typically less than about 1000 poise and even more typically less than about 800 poise.

One exemplary formulation for a base material having desirable rheological properties is provided below as table A:

TABLE A

| Ingredients | Weight Percentages |
|---|---|
| EPDM rubber | 15 |
| Hydrocarbon Resin | 7.7 |
| Polybutene | 10.5 |
| Iron Phosphide | 21.5 |
| Carbon Black | 10 |
| Mineral Fillers | 20 |

TABLE A-continued

| Ingredients | Weight Percentages |
|---|---|
| Oil | 11 |
| Sulfur | 0.5 |
| Sulfur Cure Activators | 3.0 |
| Blowing Agent | 0.8 |

Such displaceable materials as described herein can be particularly suitable for allowing weld-through. Thus, in one embodiment of the present invention, it is contemplated that the base material is applied to a portion of the member and the portion of the member is subsequently welded. Generally, the member may be welded to another member or welding may be carrier out on the single member. Moreover, the welding may take place prior to, during or after assembly of the member to its article of manufacture (e.g., an automotive vehicle).

Film or Layer

When included, the film or layer may be formed of a variety of different materials, however, polymeric materials are typically favored. For example, and without limitation, the polymeric materials can include polyamide, polybutylene, polyolefin, polycarbonate, polyester, polyphenylene, polyester, polypropylene, polyethylene, acrylate, acetate, halogenated polymers combinations thereof or the like. In favored embodiments for particular applications, the films are formed of a polyethylene copolymer such as low density polyethylene (LDPE), an acetate such as ethylene vinyl acetate (EVA), an acrylate such as ethylene methacrylate (EMA), epoxy materials, combinations thereof or the like. In particular embodiments, it is preferred that the film tends to at least slightly melt or soften upon exposure to heat such that it can wet and assist in sealing and/or adhering to a structure to which the synthetic material is applied, however, such is not required.

In one embodiment, the film or layer includes a substantial amount of an acrylate, particularly a polymeric acrylate. When included, the film typically includes at least 5% or less, more typically at least 15%, even more typically at least 25% and even more typically at least 33% by weight polymeric acrylate. Also when included, the film or layer typically includes less than about 90%, more typically less than about 60% and even more typically less than about 40% by weight acrylate. One particularly preferred acrylate is a relatively high melt flow index ethylene methyl acrylate (EMA) copolymer sold under the tradename OPTEMA TC 140 commercially available from ExxonMobil Chemical.

In one embodiment, the film or layer includes an amount of epoxy resin. Epoxy resin is used herein to mean any of the conventional dimeric, oligomeric or polymeric epoxy materials containing at least one epoxy functional group. The epoxy materials may be epoxy containing materials having one or more oxirane rings polymerizable by a ring opening reaction. The epoxy may be aliphatic, cycloaliphatic, aromatic or the like. The epoxy may be supplied as a solid (e.g., as pellets, chunks, pieces or the like) or a liquid. The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive. When included, the film typically includes at least 1% or less, more typically at least 2.5%, even more typically at least 3.5% and even more typically at least 4.5% by weight epoxy resins. Also when included, the film typically includes less than about 40%, more typically less than about 13% and even more typically less than about 7% by weight epoxy resins. An example of one preferred epoxy resin is sold under the tradename DER 662 and is commercially available from Dow Chemical Corporation, Midland, Mich.

The film or layer will typically include a curing agent, a curing agent accelerator or both. Amines, amides, peroxides, peroxide coagents, or other chemicals are examples of typical curing agents or curing agent accelerators suitable for curing epoxies, acrylates, combinations thereof or the like. Useful classes of curing agents for such polymeric compounds include, without limitation, aliphatic or aromatic amines or their respective adducts, amidoamines, polyamides, cycloaliphatic amines, (e.g., anhydrides, polycarboxylic polyesters, isocyanates, phenol-based resins (such as phenol or cresol novolak resins, copolymers such as those of phenol terpene, polyvinyl phenol, or bisphenol-A formaldehyde copolymers, bishydroxyphenyl alkanes or the like), peroxides or mixtures thereof. Other exemplary curing agents include modified and unmodified polyamines or polyamides such as triethylenetetramine, diethylenetriamine tetraethylenepentamine, cyanoguanidine, dicyandiamides and the like. Exemplary accelerators for the curing agents might include a modified or unmodified urea such as methylene diphenyl bis urea, an imidazole, a combination thereof or the like.

The film or layer or the base material may also include other additives as well. Exemplary additives can include oils, waxes, fillers, foaming agents, processing aids, agents or performance modifiers, UV resistant agents, flame retardants, impact modifiers, heat stabilizers, colorants, lubricants, combinations thereof or the like.

According to one preferred embodiment, the film or layer material includes a hydrocarbon resin (e.g., a C5 resin, a C9 resin, a combination thereof or the like). The hydrocarbon resin may be saturated, unsaturated or partially unsaturated (i.e., have 1, 2, 3 or more degrees of unsaturation). One example of a preferred hydrocarbon resin is a coumarone-indene resin. Another example of a preferred hydrocarbon resin is sold under the tradename NORSELENE® S-105 and is commercially available from Sartomer Company, Inc., 502 Thomas Jones Way, Exton, Pa. 19341

Another preferred but optional additive is a synthetic wax sold under the tradename PARAFLINT A28 commercially available form Moore and Munger, Inc. Yet another preferred but optional additive is a polymer wax sold under the tradename AC POLY 680 or A-C® 680 commercially available from Honeywell International, Specialty Wax and Additives, 101 Columbia Road, Morristown, N.J. 07962. Still another preferred but optional additive is a polymer sold under the tradename ROSS WAX 3002 commercially available from Frank B. Ross Company, Inc., P.O. Box 4085, Jersey City, N.J. 07304-0085.

The film or layer may also include one or more fillers, including but not limited to particulated materials (e.g., powder), beads, microspheres, or the like. Preferably the filler includes a relatively low-density material that is generally non-reactive with the other components present in the adhesive material.

Examples of fillers include silica, diatomaceous earth, glass, clay, talc, pigments, colorants, glass beads or bubbles, glass, carbon ceramic fibers, antioxidants, calcium carbonate and the like. Such fillers, particularly clays, can assist the adhesive material in leveling itself during flow of the material. The clays that may be used as fillers may include clays from the kaolinite, illite, chloritem, smecitite or sepiolite groups, which may be calcined. Further examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

Typically, the film or layer includes one or more conductive materials, which can assist in weld-through of the material. Examples of such materials includes graphite, carbon-black, iron phosphide, iron phosphite, metal particulate (e.g., pellets, shavings or the like), combinations thereof or the like. Typically, the film includes at least 2.0%, more typically at least 5%, even more typically at least 8% and even more typically at least 12% by weight conductive material (e.g., 15%). However, the film can include less than 2.0% conductive material unless otherwise specified. In one preferred embodiment, the conductive material is substantially entirely an iron phosphide or iron phosphite. One exemplary preferred conductive material is a iron phosphide or iron phosphite sold under the tradename FERROPHOS 2131 and commercially available from Alufinish GmbH or Oxychem. Another preferred conductive material is the graphite as described in relation to the base material. Still other preferred conductive materials include metal coated graphite (e.g., nickel coated graphite) and metal alloyed graphite (e.g., nickel alloyed graphite).

One exemplary formulation for a material having desirable properties for the film is provided below as table B:

TABLE B

| Ingredients | Weight Percentages |
|---|---|
| EVA | 60 |
| Modified EMA | 12 |
| Graphite | 14.9 |
| Peroxide Curing Agent | 1 |
| Peroxide Coagent | 1 |
| Oil | 5 |
| Wax | 6 |
| Dicyandiamide | 0.1 |

It is also contemplated that the film could have correspondence components or chemically compatible components in common with the mass of expandable material. As used herein, correspondence components are polymeric components in the film that correspond to polymeric components present in the expandable material. A correspondence component may be a component in the film that is substantially identical to a component in the expandable material. Alternatively, a correspondence component may be a component of the film having a substantially identical monomer or oligomer configuration to its corresponding component in the expandable material, but the correspondence component may have a greater molecular weight or longer polymeric chain structure. As another alternative, a correspondence component may be a component in the film that is only insubstantially different from its corresponding component in the expandable material (e.g., exhibits substantially the same characteristics, has at least a similar polymeric structure, but has a higher molecular weight). Such correspondence components are further described in copending U.S. patent application Ser. No.

10/217,991, filed Aug. 13, 2002, titled "Synthetic Material and Method of Forming Same", which is expressly incorporated herein by reference for all purposes. Thus, it is contemplated that the film may include some or all of the components included in the base material. While the film may be formed of the same material as the base material, preferably their materials are different.

Although not required, the film of the present invention is typically formed or processed by some type of stretching or thinning technique such as blowing. Thus, in one embodiment, the film is formed by extruding the material of the film followed by heating and stretching the material of the film until the film has a desired thickness.

When the synthetic material include both the base material and the film or layer as opposed to just the base material, the film or layer may be applied to the mass of base material using a variety of techniques, which may be manual, semi-automated, or more fully automated. If the base material is tacky at about room temperature, the film typically need only be contacted with the surface of the expandable material such that the base material adheres to the film holding it in place. If the base material is substantially non-tacky, then it may be desirable for the film to be adhered to the surface of the base material with an adhesive. Alternatively, the base material may be heated to a temperature that allows the base material to wet and adhere to the film without actually activating the base material. For example, the base material may be extruded at an elevated temperature such that the base material is emitted from the extruder in a viscoelastic/tacky state and the film may be contacted with the base material (e.g., by coextrusion, manual contacting or the like) shortly after extrusion such that the base material can wet the film and adhere to the film as the base material cools and then becomes substantially non-tacky or may remain tacky. As another alternative the film may be heated such that it can wet and adhere to the base material.

It is also contemplated that the film may be placed upon a non-tacky base material followed by heating both the base material and the film for adhering the film to the base material. In yet another embodiment, the film may be formed by locating the material of the film on the base material in an at least partially liquid state followed by allowing the film to solidify thereon.

Application

Generally, the synthetic material is applied to a structure of an article of manufacture. In one preferred embodiment, the structure may be part of an automotive vehicle. For example, the structure might be a frame member, a body member, a bumper, a pillar, a panel, a support structure or the like of an automotive vehicle.

Typically, the synthetic material is applied directly to a structure such that the material can provide reinforcement; acoustic damping, sealing, adhesion, NVH reduction or the like to the structure or adjacent structures or members. For application, the synthetic material may be configured with a fastener for attaching the material to a structure. Alternatively, the synthetic material may be configured with a magnet, a magnetic material, an adhesive or the like for attaching or adhering the synthetic material to the structure. As still another alternative, the synthetic material may be applied to a carrier such that the carrier and synthetic material may be applied to (e.g., placed within a cavity of) a structure.

In one embodiment, the base material of the synthetic material is tacky and can be adhered to a surface of a structure for applying the synthetic material to that structure. In such an embodiment, an individual or machine can contact at least a portion of the tacky surface of the base material with a surface of the structure to adhere the synthetic material to the structure.

In a preferred embodiment, the synthetic material and particularly the base material is a displaceable material and is particularly suitable for allowing weld-through and/or welding adjacent the material. Thus, in one embodiment of the present invention, it is contemplated that the synthetic material (e.g., as just the base material or including the film or layer as well) is applied to a portion of the structure (e.g., member) and the portion of the structure is subsequently welded. Generally, the structure may be welded to another structure or welding may be carried out on the single structure. Moreover, the welding may take place prior to, during or after assembly of the structure to its article of manufacture (e.g., an automotive vehicle). Although the welding operation may not be intended to form a weld through the synthetic material, the weld-through capability of the material can still be advantageous for a circumstance in which the synthetic material has been applied to the wrong area of a structure such that a weld must be formed through the material. In such circumstance, synthetic material will typically allow a sufficient weld to still be formed through the material.

Figure 3:
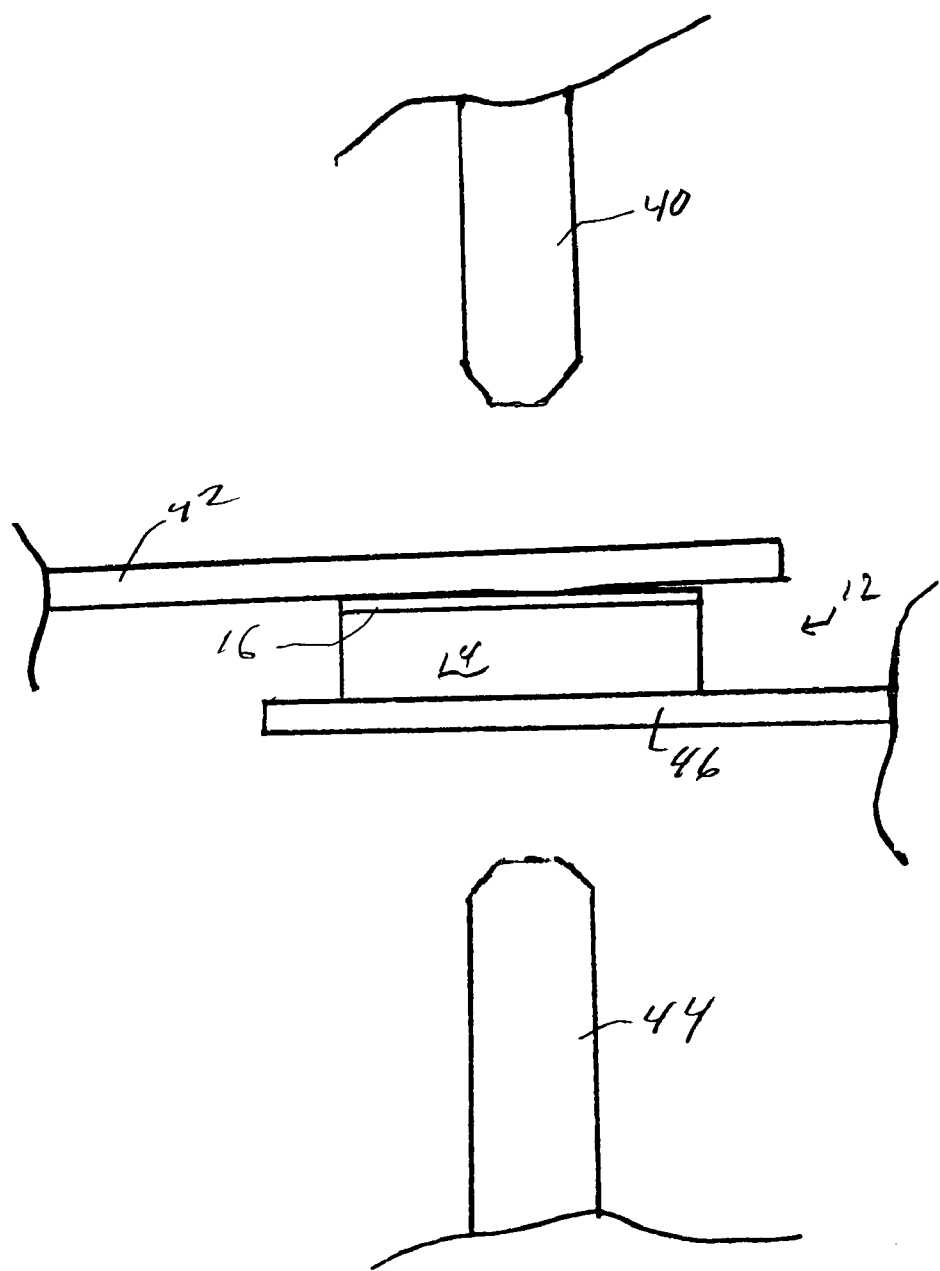
FIG. 3 is a sectional view of one stage of an exemplary welding operation being performed in accordance with an aspect of the present invention.

According to one embodiment, electrical resistance welding is employed, although other techniques may be employed as well. In such an embodiment, and referring to FIG. 3, a first electrode 40 is typically brought into abutting contact with a surface of a first member 42 and a second electrode 44 is typically brought into abutting contact with a surface of a second member 46. Upon such contact, at least a portion of the first member 42 and the second member 46 are located between the electrodes 40, 44. As shown, a mass (shown as a strip) of synthetic material 12 may be located between the members 42, 46, the electrodes 40, 44 or both. For welding, the electrodes 40, 44 move portions of the members 42, 46 toward each other thereby displacing a portion of the synthetic material 12. Typically the portion of the members 42, 46 contact each other, although not necessarily required. At the same time or thereafter, an electrical current is typically induced to flow between the first electrode 40 and a second electrode 44 thereby forming one or more welds between and/or joining the first member 42 and the second member 46. Typically the weld is at least partially surrounded or substantially encircled by the base material 14, the film 16 or both of the synthetic material 12.

As shown, the synthetic material 12 includes the film 16. Advantageously, the film 16, particularly when it is substantially non-tacky, can allow an individual or machine to more easily contact the synthetic material during application without sticking or adhering to the material. Also advantageous, when the film includes a conductive material, the film assists in or at least provides minimal interference with the formation of the weld.

After application, the synthetic material is preferably activated to cure, expand or both as has been described herein. Such activation may occur before welding, during welding, but typically occurs thereafter when a welding operation is performed. When the members are part of an automotive vehicle structure (e.g., body or frame components), the activation typically occurs during paint or coating (e.g., e-coat) processing steps.

After activation and depending upon the intended use of the synthetic material, the material will typically exhibit one or more desired characteristics such as strength, sound absorption, vibration dampening, noise reduction, combinations thereof or the like. In one exemplary embodiment, which is particularly useful for reinforcement, the activatable or activated material can exhibit a shear strength (e.g., a lap shear strength) greater than about 500 psi, more typically greater than about 1000 psi, even more typically greater than about 1500 psi and still more typically greater than about 2200 psi.

When used in conjunction with spot or electrical resistance welding, it is typically desirable for the synthetic material to exhibit certain characteristics. For example, certain embodiments of the synthetic material can exhibit relatively low amounts of weld attenuation (i.e., the synthetic material may allow substantially full current flow between electrodes within 5 cycles or less, more typically in 4 cycles or less, even more typically is in 3 cycles or less and still more typically in 2 or 1.5 cycles or less of the current to the electrodes). As another example, certain embodiments of the synthetic material will allow for the current through the electrodes, the metal panels and the synthetic material to be at least 60%, at least 80%, more typically at least 90% and even more typically at least 92% of the amount of current that would be allowed through the same panels without the synthetic material with a same amount of electrical power or voltage delivered to the electrodes. As another example, certain embodiments of the synthetic material will allow for the size of a weld formed by flowing current through the electrodes, the metal panels and the synthetic material to be at least 60%, at least 80%, more typically at least 90% and even more typically at least 92% of the size of a weld formed by flowing current through the same panels without the synthetic material with a same amount of electrical power or voltage delivered to the electrodes.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of providing sealing, reinforcement, structural adhesion, baffling or a combination thereof to a structure of an automotive vehicle while allowing for welding, the method comprising:
   providing a mass of synthetic material, the synthetic material including a base material, the base material including a conductive filler;
   applying the mass of synthetic material to a member;
   performing a weld operation upon the member wherein the weld operation displaces at least a portion of the mass of synthetic material and forms a weld having a size that is at least 80% of the size of a weld formed by performing a weld operation upon the member without the synthetic material but with a same amount of electrical power or voltage; and
   activating, after performance of the weld operation, the synthetic material to cure in an automotive paint or coating processing step in an automobile assembly plant such that the synthetic material adheres to the member and provides sealing, reinforcement, structural adhesion, baffling or a combination thereof to the member;
   wherein the base material includes at least 12% by weight conductive filler and the at least 12% by weight conductive filler is selected from the group consisting of graphite, carbon black, iron phosphide, iron phosphite or combinations thereof;
   wherein the synthetic material includes a layer disposed upon at least one surface of the base material, the layer being a film having a thickness that is less than 0.5 mm; and
   wherein the layer includes at least 12% by weight conductive filler, the conductive filler including graphite.

2. A method as in claim 1 wherein the base material is tacky at temperatures between about 10° C. and about 50° C.

3. A method as in claim 1 wherein the base material, upon activation, expands to at least about 101% its original unexpanded volume.

4. A method as in claim 1 wherein the conductive material of the layer is entirely graphite.

5. A method as in claim 1 wherein the base material has a viscosity, at 45° C. and a shear rate of 400 1/s of less than about 800 poise.

6. A method as in claim 1 wherein the layer is a polymeric film.

7. A method as in claim 1 wherein the conductive filler in the layer also includes is iron phosphide or iron phosphite.

8. A method of providing sealing, reinforcement, structural adhesion, baffling or a combination thereof to a structure of an automotive vehicle while allowing for welding, the method comprising:
   providing a synthetic material wherein the synthetic material includes:
   i) a mass of base material having at least one surface, the mass of material including a conductive filler; and
   ii) a layer disposed upon the at least one surface, the layer being a film that also includes a conductive filler, the conductive filler including graphite;
   placing the synthetic material between a first member and a second member of the automotive vehicle, both the first member and the second member having an outwardly facing surface and an inwardly facing surface;
   contacting the outwardly facing surface of the first member with a first electrode and contacting the outwardly facing surface of the second member with a second electrode;
   inducing an electrical current to flow between the first and second electrodes for forming a weld connecting the first member to the second member, the weld being at least 80% of the size of a weld formed by flowing current through the same members without the synthetic material but with a same amount of electrical power or voltage delivered to the electrodes; and
   activating, after forming the weld, the base material to cure in an automotive paint or coating processing step in an automobile assembly plant wherein the base material is a thermally activated material that cross-links upon activation and adheres to the first member, the second member or both;
   wherein provision of the synthetic material includes stretching of the film to thin the film.

9. A method as in claim 8 wherein the base material includes at least 8% by weight conductive filler.

10. A method as in claim 9 wherein the layer includes at least 8% by weight conductive filler.

11. A method as in claim 10 wherein the conductive filler in the base material is iron phosphide or iron phosphite.

12. A method as in claim 11 wherein the electrical current that flows between the electrodes is at least 80% of an amount of current that would flow through the members without the synthetic material therebetween.

13. A method as in claim 12 wherein the layer includes one or more correspondence components in common with the base material.

14. A method as in claim 12 wherein the synthetic material exhibits a post activation shear strength of greater than about 1500 psi.

15. A method as in claim 12 wherein the base material is tacky at temperatures between about 10° C. and about 50° C.

16. A method of providing sealing, reinforcement or baffling to a structure of an automotive vehicle while allowing for welding, the method comprising:
   providing a synthetic material wherein the synthetic material includes:
   i) a mass of base material having at least one surface, the mass of material including at least 12% by weight conductive filler, the conductive filler of the base material including at least one of graphite, iron phosphide or iron phosphite, the base material having a viscosity, at 45° C. and a shear rate of 400 1/s, of less than 800 poise; and
   ii) a layer disposed upon the at least one surface, the layer being a polymeric film that also includes at least 12% by weight conductive filler, the conductive filler of the layer including a synthetic graphite having a range of 70 to 270 mesh;
   placing the synthetic material between a first panel and a second panel of the automotive vehicle, both the first panel and the second panel having an outwardly facing surface and an inwardly facing surface;
   contacting the outwardly facing surface of the first panel with a first electrode and contacting the outwardly facing surface of the second panel with a second electrode such that at least a portion of the synthetic material is displaced;
   inducing an electrical current to flow between the first and second electrodes for forming a weld connecting the first panel to the second panel wherein the electrical current that flows between the electrodes is at least 90% of an amount of current that would flow through the panels without the synthetic material therebetween, and wherein the weld is at least 90% of the size of a weld formed by flowing current through the same members without the synthetic material but with a same amount of electrical power or voltage delivered to the electrodes and wherein the synthetic material allows substantially full current flow between electrodes within 3 cycles or less of the current to the electrodes; and
   activating the base material wherein the base material is a thermally activated material that cross-links upon activation wherein the synthetic material exhibits a post activation lap shear strength of greater than about 1500 psi.

17. A method as in claim 1 wherein the synthetic material exhibits a lap shear strength of at least 1000 psi after activation.

18. A method as in claim 1 wherein the synthetic material provides sealing or structural adhesion to the member and, the synthetic material either expands to a volume that is 500% it unexpanded volume to assist in providing sealing or the synthetic material exhibits a lap shear strength of at least 1500 psi to assist in providing structural adhesion.

* * * * *

UNITED STATES PATENT AND TRADEMARK OFFICE
CERTIFICATE OF CORRECTION

PATENT NO.        : 7,392,929 B1  
APPLICATION NO.   : 11/188679  
DATED             : July 1, 2008  
INVENTOR(S)       : Terry Finerman Page 1 of 1

It is certified that error appears in the above-identified patent and that said Letters Patent is hereby corrected as shown below:

Column 12, line 29 delete "is".

Signed and Sealed this

Twenty-sixth Day of August, 2008

JON W. DUDAS  
*Director of the United States Patent and Trademark Office*